No. 852,552. PATENTED MAY 7, 1907.
F. E. GABBERT.
COMPUTING SCALE.
APPLICATION FILED OCT. 3, 1906.
2 SHEETS—SHEET 1.
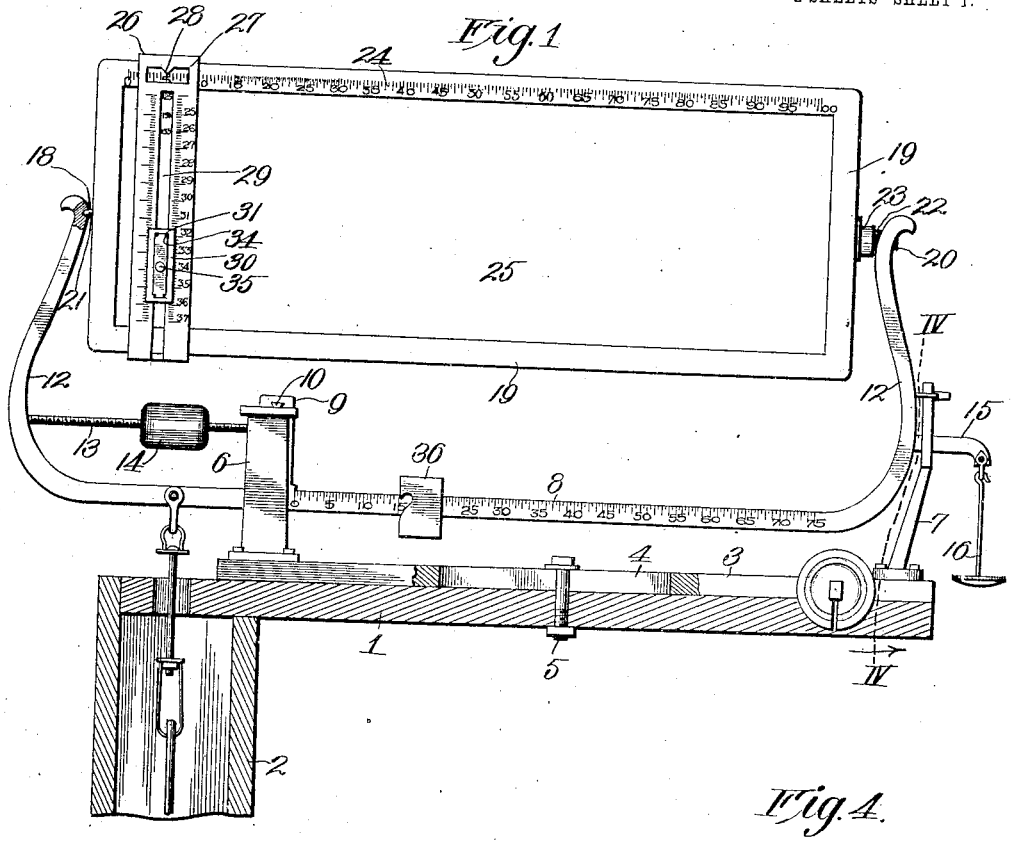
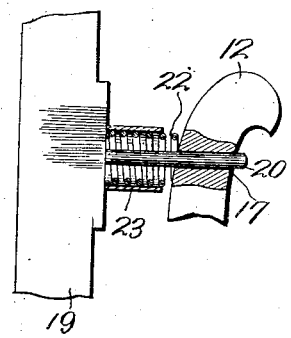
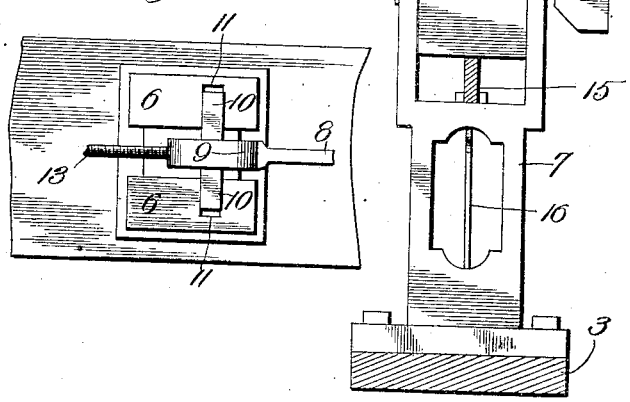
Witnesses:
Frank R. Glore
H. C. Rodgers
Inventor:
F. E. Gabbert
By George H. Thorp
Atty.

No. 852,552. PATENTED MAY 7, 1907.
F. E. GABBERT.
COMPUTING SCALE.
APPLICATION FILED OCT. 3, 1906.
2 SHEETS—SHEET 2.
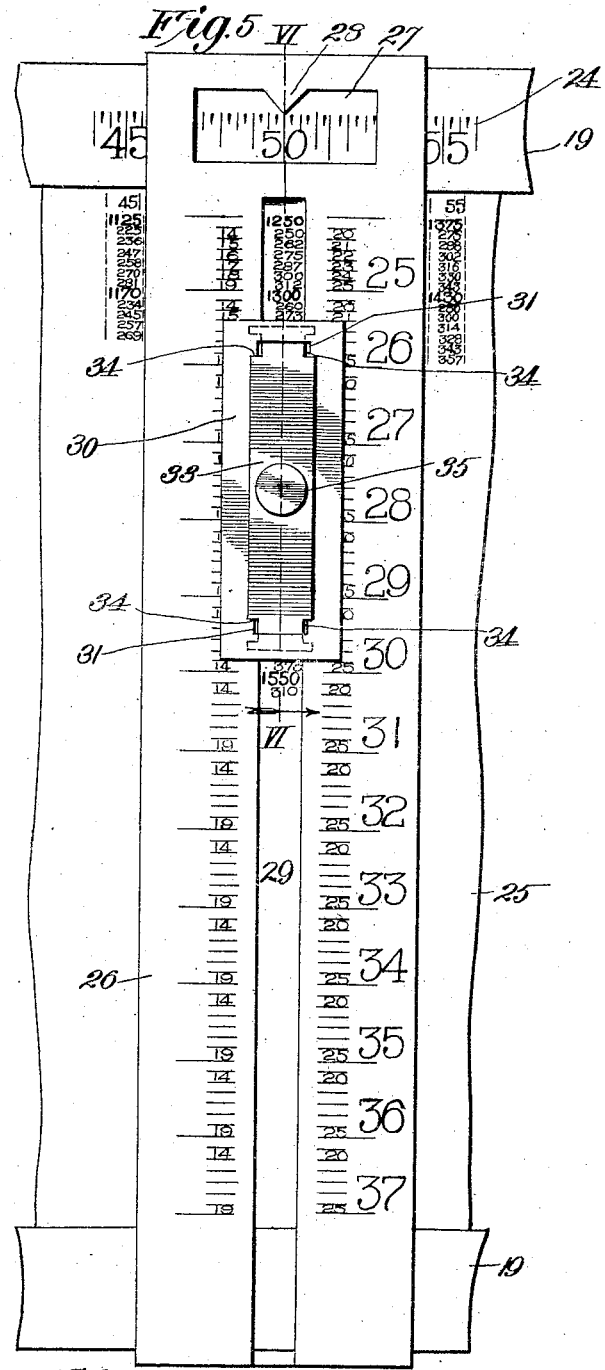
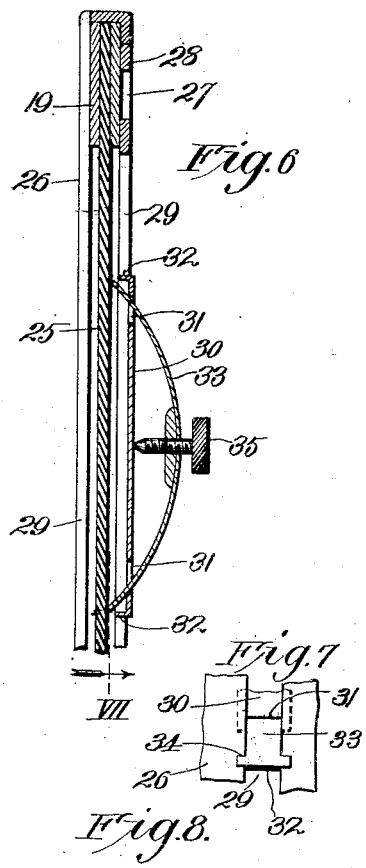
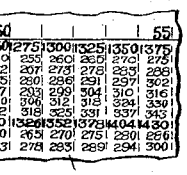
Witnesses:
Frank R. Glore
H. C. Rodgers
Inventor:
F. E. Gabbert.
By George H. Thorpe Atty.

UNITED STATES PATENT OFFICE.

FREDRICK E. GABBERT, OF KELLY, KANSAS.

COMPUTING-SCALE.

No. 852,552.     Specification of Letters Patent.     Patented May 7, 1907.

Application filed October 3, 1906. Serial No. 337,300.

*To all whom it may concern:*

Be it known that I, FREDRICK E. GABBERT, a citizen of the United States, residing at Kelly, in the county of Nemaha and State of Kansas, have invented certain new and useful Improvements in Computing-Scales, of which the following is a specification.

My invention relates to computing scales and more especially to that type of scale which shows the weight of the commodity and the money value of the same, and my object is to produce a scale of this character of simple, strong, durable and cheap construction.

A further object is to produce a scale of this character which will also show the net weight of cream and the money value of the butter fat contained in such cream.

With these objects in view and others as hereinafter appear, the invention consists in certain novel and peculiar features of construction and organization as hereinafter described and claimed; and in order that it may be fully understood reference is to be had to the accompanying drawings, in which—

Figure 1, represents a scale partly in side elevation and partly in central vertical section, embodying my invention. Fig. 2, is a plan view of a portion of the scale. Fig. 3, is a view partly in elevation and partly in central vertical section of a portion of the scale. Fig. 4, is a vertical section on the line IV—IV of Fig. 1. Fig. 5, is a full-sized view of a portion of the scale. Fig. 6, is a vertical section taken on the dotted line VI—VI of Fig. 5. Fig. 7, is a vertical section on the line VII of Fig. 6. Fig. 8, is a face view of a portion of the computing chart.

In the said drawings, 1 indicates a portion of the frame and 2 a part of the box of a scale of any suitable type. 3 indicates the base of the upper portion of the scale resting on frame 1, provided with a longitudinal slot 4 through which the securing bolt 5 of the frame extends. 6 indicates standards at one end of the base, and 7 a guide standard at the opposite end of said base.

8 indicates the tare beam provided with an upwardly projecting arm 9, equipped with outwardly projecting knife bearings 10, engaging bearing cavities 11 in the upper ends of standards 6.

12 indicates arms projecting upwardly from the ends of the tare beam, 13 the usual threaded rod connecting one of said arms with arm 9 and equipped with an adjustable poise 14 known as the scoop poise.

15 is an arm projecting from the contiguous arm 12 through the standard 7 and pivotally suspended from arm 15 is the weight-carrying rod 16. The arm 12 from which arm 15 projects is provided with a horizontal aperture 17 in longitudinal alinement with the cavity 18 in the other arm 12.

19 indicates a rectangular frame provided centrally of one end bar with a pin 20 to find a journal in aperture 17, the other end bar of said frame being provided with a pin 21 to find a journal in the cavity 18. In securing the frame in position pin 20 is first slipped into the aperture 17 until pin 21 is in alinement with aperture 18 and then the movement of the frame is reversed to effect engagement between the last-named pin and cavity 18. To enable the operator to so dispose the frame, the length of the latter is less than the distance between the upper ends of arms 12 and to prevent accidental dislocation of pin 21 from cavity 18, expansive spring 22 is mounted on pin 20 and bears at its opposite ends against the contiguous arm 12 and the base of a sleeve 23 rigid with the frame and pin 20 and surrounding the spring 22 to centralize it with respect to said pin. The frame as thus arranged is reversible, that is to say it is rotatable so that either face can be disposed toward the operator. At opposite sides said frame is provided with a scale 24 representative of pounds and fractions thereof, said graduations being so disposed that they appear at the top of the frame when its corresponding side faces toward the salesman.

25 indicates a chart containing vertical columns of figures, each column containing at regular intervals figures in black or heavy type, such figures of the various columns being horizontally alined. There is one column for each pound mark of the graduations 24 and the black type figures of any column vertically alined with any particular pound mark of said graduations represents the value of the number of pounds represented by said pound mark at different prices per pound.

The black or heavy faced figures of each column also represent the number of pounds of butter fat in a quantity of cream, the weight of which is indicated by the pound mark on said graduations in vertical alinement with the particular number, and the light faced figures represent the money value of the number of pounds of butter fat represented by the first black faced figures next above, at indicated prices per pound as hereinafter explained.

26 indicates a poise for adjustment upon frame 19 and of double face construction so as to operate in conjunction with either of the graduations 24. The poise consists of a rectangular frame fitting slidingly on frame 19 and provided at one end of each side with an opening 27 to expose a portion of the graduation 24 and with a finger 28 to point to the pound marks on such graduations as they are successively encountered. The poise is likewise provided with a vertical slot 29 through which may be observed one of the vertical columns of figures of the chart. At one side of the slot the poise is provided with large figures at regular intervals, the figures shown being "25" to "37" inclusive, these figures representing the prices per pound of a commodity if the scale is to be used by a groceryman or for weighing ordinary commodities. If the scale is to be used by creameries these figures indicate butter fat tests, that is different percentages of butter fat in a pound of cream. The spaces contiguous to the large numbers are subdivided equally into seven spaces, the topmost of each series of seven spaces being horizontally alined with the horizontal series of black or heavy figures, the remaining spaces contiguous to said large figures of said poise are numbered consecutively, the figures shown being "20," "21," "22," "23," "24" and "25," these figures representing different prices per pound at which the butter fat may be sold. These poise figures are horizontally alined with light face figures of the columns of the chart, as shown clearly in Fig. 5.

The construction of the poise described is duplicated at each side with the exception that the large figures will of course be different they may run from "25" downward or from "37" upward as creameries will seldom accept cream which tests less than 25% butter fat.

To avoid the possibility of making a mistake in reading from the chart and to facilitate such reading the poise 26 is equipped at each side with a friction slide, said slide consisting of a rectangular plate 30 provided with openings 31 and with tongues 32 at its upper and lower ends which project into slot 29 of the poise to insure vertical reciprocation of the slide.

33 indicates an arc-shaped spring of greater width than aperture 31 and the slot 29 and notched at its ends as at 34 in order that such reduced portions may extend through apertures 31 and slot 29, the body portion of the spring bearing against the face of the slide and the ends of the spring beyond said notches bearing against the inner faces of the contiguous side of the poise.

35 indicates a screw carried by and bearing a threaded relation to the spring and bearing at its inner end against the slide. By adjusting the screw the spring is caused to clamp the slide against and upon the poise with sufficient pressure to hold the former at any desired point of adjustment on the latter.

In the use of the scale as an ordinary price scale when no receptacle is placed upon the scale platform, the poise 36 of the tare beam stands at "0" and is not disturbed, the poise 26 is adjusted on the frame 19 until the commodity is balanced when its finger 28 indicates the number of pounds. Assuming that the weight is fifty pounds and that the price of the commodity is twenty six cents per pound, the slide 30 is moved upward until its upper edge registers with the black or heavy faced figure showing through the slot opposite the space represented by the large figure 26 on the poise, which figure is $13.00.

If the price per pound corresponds to either of the four lower figures on the poise, the lower edge of the slide can be used as a gage in determining the value of the commodity weighed, as by such use less adjustment of the slide is necessary.

If it be desired to ascertain the money value of the butter fat contained in a quantity of cream, the can containing the cream which is to be weighed, is first weighed by means of the poise 36, though in practice the weight of such can is known and thus renders unnecessary such separate weighing operation.

Assuming that the weight is 15 lbs. the poise 36 is set at 15 as in Fig. 1, and then the net weight of the cream is ascertained by adjusting the poise 26 on frame 19. Assuming that the net weight of the cream is fifty pounds, as indicated in Fig. 5, and that the cream tests 26% (the test being known before the weighing operation takes place) the slide is moved until its upper edge registers with the division mark next below the large or test figure "26." It will thus be seen that fifty pounds of cream testing 26% contains thirteen pounds of butter fat, this being ascertained by reference to the heavy faced type which is disclosed on the chart through the slot 29 and opposite the space represented by said figure 26. Now if butter fat is selling at 21c per pound, the slide is moved upward until its upper edge registers with the figure "21" in said space, the figure showing through the slot 29 in horizontal alinement with said figure "21" representing the money value, viz 2.73 for thirteen pounds of butter fat at 21c per pound.

It will thus be seen that by means of this computing scale the value of the butter fat in any given quantity of cream at a given test can be ascertained easily and expeditiously.

From the above description it will be apparent that I have produced a computing scale possessing the desirable features enumerated and which obviously may be modified in various particulars without departing from the spirit and scope of the appended claims.

Having thus described the invention what I claim as new and desire to secure by Letters Patent, is:—

1. In a computing scale, a frame containing a graduated scale, a poise adjustable on the frame with respect to said graduations and provided with a vertical series of figures, comprising primary figures and a series of secondary figures adjacent each of the primary figures, and a chart containing a vertical series of figures, of which some are the products of the primary figures of the poise, multiplied by the number of pounds indicated on the scale by the position of the poise, the other figures of the chart being the products (in round numbers) of the first-named products multiplied by the secondary series of figures of the poise, the figures representative of the products of the first-named products multiplied by the secondary figures of the poise being disposed in horizontal alinement with said last-named figures of the poise.

2. In a computing scale, the combination with a frame containing a graduated scale and a poise adjustable on the frame with respect to said graduations and provided with a vertical series of figures, comprising primary figures and a series of secondary figures adjacent each of the primary figures and provided also with a vertical slot at one side of its vertical series of figures, of a chart containing a vertical series of figures visible through said slot, of which some are the products of the primary figures of the poise multiplied by the number of pounds indicated on the scale by the position of the poise, the other figures of the chart being the products (in round numbers) of the first-named products multiplied by the secondary series of figures on the poise; the figures representative of the products of the first-named products multiplied by the secondary figures of the poise being disposed in horizontal alinement with the said last-named figures of the poise.

3. In a computing scale, a frame containing a graduated scale, a poise adjustable on the frame with respect to said graduations and provided with a vertical series of figures, comprising primary figures and a series of secondary figures adjacent each of the primary figures and provided also with a vertical slot at one side of its vertical series of figures, a chart containing a vertical series of figures visible through said slot, of which some are the products of the primary figures of the poise multiplied by the number of pounds indicated on the scale by the position of the poise, the other figures of the chart being the products (in round numbers) of the first-named products multiplied by the secondary series of figures on the poise; the figures representative of the products of the first-named products multiplied by the secondary figures of the poise being disposed in horizontal alinement with the said last-named figures of the poise, and a slide mounted on the poise and bridging its slot and adjustable along the length thereof with reference to any particular figure of the chart exposed through the slot of the poise.

4. In a computing scale, a tare beam suitably fulcrumed and provided with a poise and upwardly projecting arms, a reversible frame carried by said arms and provided with a longitudinal graduated scale, a chart carried by the frame, a sliding poise mounted on the frame and provided with an opening to expose a portion of the graduated scale, and an index finger to point to any graduation of said scale and provided with a vertical slot in line with said index finger, and a slide mounted on the poise and adjustable lengthwise of said slot.

5. In a computing scale, a frame provided with a graduated scale, a chart carried by the frame, a sliding poise mounted on the frame and provided with an opening to expose a portion of the graduated scale and an index finger to point to any graduation of the said scale and provided also with a vertical slot in line with the index finger, and a slide mounted on the poise and adjustable lengthwise of the slot and comprising a plate bridging said slot and provided near its upper and lower ends with openings, a bowed spring having notches in the opposite edges of its ends and its notched portions extending through said openings and said slot and its unnotched extremities fitting against the face of the poise contiguous to the chart, and a screw engaging and adjustable through the spring and bearing against the opposing side of said plate.

In testimony whereof I affix my signature, in the presence of two witnesses.

FREDRICK E. GABBERT.

Witnesses:
H. C. RODGERS,
G. Y. THORPE.